US009843482B1

(12) United States Patent
Thirumurthi et al.

(10) Patent No.: US 9,843,482 B1
(45) Date of Patent: Dec. 12, 2017

(54) ANALYTICS DRIVEN TRAFFIC REDIRECTION AND LOAD BALANCING WITH OPEN NETWORK MANAGEMENT SOFTWARE

(71) Applicant: CISCO TECHNOLOGY, INC., San Jose, CA (US)

(72) Inventors: Rajendra Kumar Thirumurthi, Cupertino, CA (US); Samar Sharma, San Jose, CA (US); Praveen Parthasarathy Iyengar, San Jose, CA (US); Mouli Vytla, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 14/951,207

(22) Filed: Nov. 24, 2015

(51) Int. Cl.
*H04L 12/26* (2006.01)
*H04L 12/24* (2006.01)
*H04L 12/10* (2006.01)
*H04L 12/801* (2013.01)
*G06F 1/32* (2006.01)

(52) U.S. Cl.
CPC ........ *H04L 41/0826* (2013.01); *G06F 1/3287* (2013.01); *G06F 1/3296* (2013.01); *H04L 12/10* (2013.01); *H04L 43/0894* (2013.01); *H04L 47/12* (2013.01)

(58) Field of Classification Search
CPC .................. H04L 12/4695; H04L 45/245
See application file for complete search history.

(56) References Cited

U.S. PATENT DOCUMENTS

| 7,149,185 | B1 * | 12/2006 | Suni ................... H04Q 11/0478 370/230 |
| 2002/0054567 | A1 * | 5/2002 | Fan ......................... H04L 47/11 370/230 |
| 2012/0303413 | A1 | 11/2012 | Wang et al. |
| 2012/0317276 | A1 | 12/2012 | Muniraju |
| 2013/0129341 | A1 * | 5/2013 | D'Errico ............... H04B 10/032 398/5 |
| 2015/0200862 | A1 | 7/2015 | Muniraju |

* cited by examiner

*Primary Examiner* — Alvin Zhu (57) ABSTRACT

A method is provided in one example embodiment and includes calculating a packet metric for a first one of a plurality of links connected to a network element, wherein the packet metric is equal to a packet count over a period of time T divided by a maximum throughput of the first one of the links; and determining based on the packet metric whether traffic on the one of the links should be switched to another one of the plurality of links to optimize power usage. If a determination is made that the traffic on the first one of the links should be switched to another one of the plurality of links, the method further includes selecting a second link from a subset of the plurality of links; assigning the traffic to the selected second link; and applying a cost saving measure at an interface of the network element to which the first link is connected.

15 Claims, 4 Drawing Sheets

| BUCKET_NAME | SWITCHING_COST | THROUGHPUT_LIMIT (t(x)) |
|---|---|---|
| HIGH | static_power/t(1) | max_throughput/3 |
| MEDIUM | peak_power/(2*t(2)) | 2*max_throughput/3 |
| LOW | peak_power/t(3) | max_throughput |

ANALYTICS DRIVEN TRAFFIC REDIRECTION AND LOAD BALANCING WITH OPEN NETWORK MANAGEMENT SOFTWARE

TECHNICAL FIELD

This disclosure relates in general to the field of communications networks and, more particularly, to a technique for analytics driven traffic redirection and load balancing with open network management software in such networks.

BACKGROUND

In today's enterprise or development environment, a variety of network devices, servers, virtual machines, and hardware resources are deployed. As network traffic increases, so do the costs of deploying network resources. On a day-to-day and/or hour-to-hour basis, not all network links are being used simultaneously and the usage at various times of day and days of the week also varies significantly. In particular, usage may be minimal on the weekends and nights.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes calculating a packet metric for a first one of a plurality of links connected to a network element, wherein the packet metric is equal to a packet count over a period of time T divided by a maximum throughput of the first one of the links; and determining based on the packet metric whether traffic on the one of the links should be switched to another one of the plurality of links to optimize power usage. If a determination is made that the traffic on the first one of the links should be switched to another one of the plurality of links, the method further includes selecting a second link from a subset of the plurality of links; assigning the traffic to the selected second link; and applying a cost saving measure at an interface of the network element to which the first link is connected.

Example Embodiments

Figure 1:
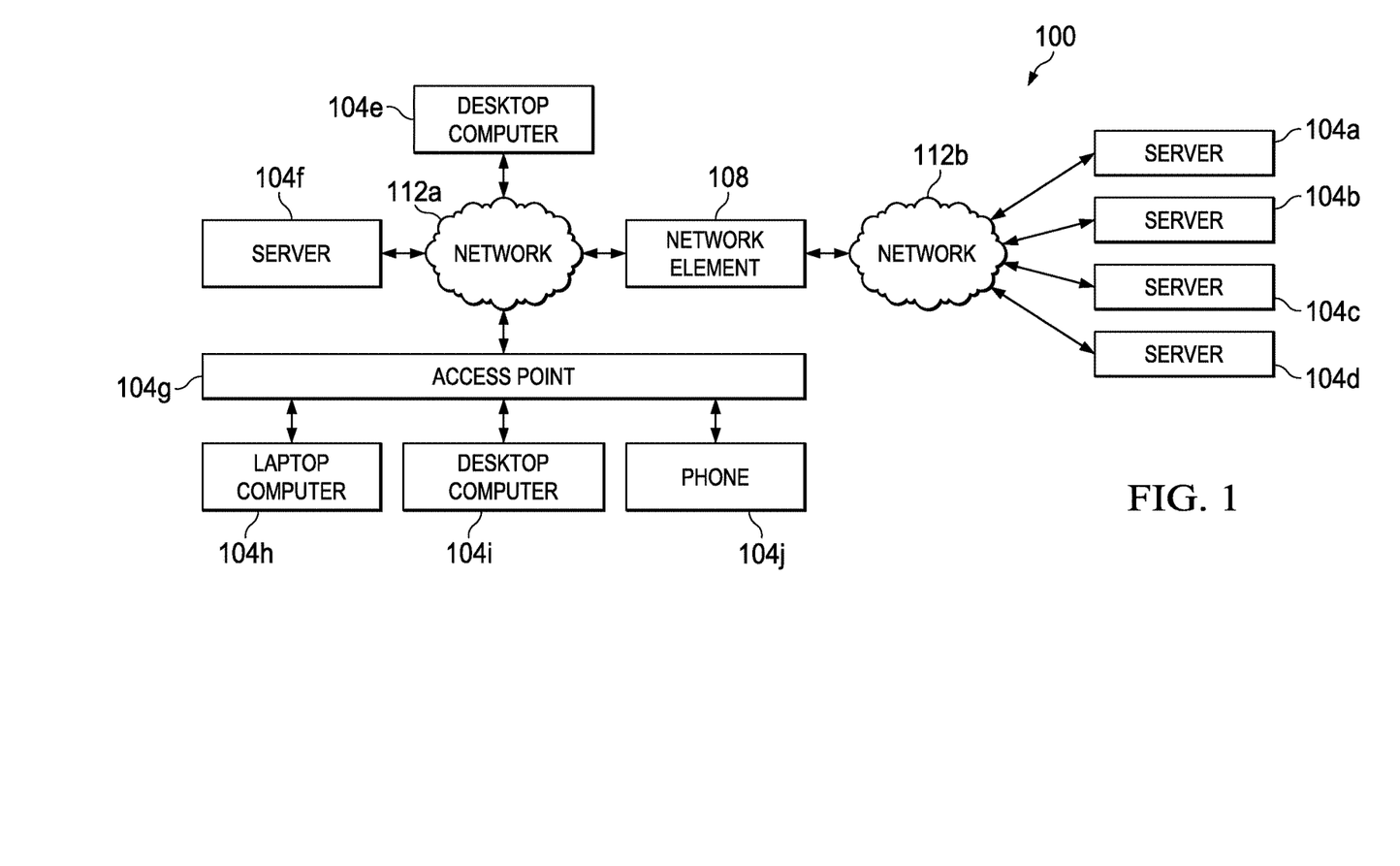
FIG. 1 illustrates a block diagram of a system for implementing an analytics driven traffic redirection and load balancing technique in accordance with embodiments described herein.

FIG. 1 illustrates a block diagram of a system 100 for providing analytics driven traffic redirection and load balancing with open network management software in accordance with certain embodiments. System 100 includes various network nodes 104 coupled to network element 108 via networks 112a and 112b. In operation, network element 108 forwards network traffic (e.g., data packets) from one or more network nodes 104 or an internal component of network element 108 to one or more other network nodes 104 or an internal component of network element 108. Network element 108 may implement various traffic forwarding rules derived from commands received from a network administrator associated with network element 108. For example, commands received may include access control list (ACL) commands, load balancing commands, and/or redirection commands. As an example, a network administrator may instruct network element 108 to permit some traffic and deny other traffic through one or more ACLs. On the traffic that is permitted, the network administrator instructs the network element 108 to apply redirection and/or load-balancing. Thus, the network element 108 may provide customization of the traffic forwarding by a network administrator.

As the number of network nodes in a network increases, complexity in the network increases as well. As the network complexity increases, implementation of customized traffic forwarding rules may require additional hardware and/or software resources, power, and time to implement, particularly if the customization is implemented in a serial fashion (e.g., a packet may go through logic implementing a user-specified ACL, and then different logic implementing a load balancer, and then other logic implementing redirection).

Various embodiments of the present disclosure provide systems and methods for simultaneously performing access control operations, load-balancing, and/or redirection operations. Such embodiments provide efficient utilization of network element 108's resources and faster operation than systems that perform traffic forwarding customization operations in a serial fashion. In particular embodiments, a user-specific ACL command may be implemented in parallel with a redirection and/or load balancing command in the same clock cycle of network element 108.

Network element 108 may be any device or system operable to forward traffic in conjunction with customized rules. For example, network elements may include network switches, routers, servers (physical servers or servers virtually implemented on physical hardware), machines (physical machine or machines virtually implemented on physical hardware), end user devices, access points, cable boxes, gateways, bridges, load balancers, firewalls, inline service nodes, proxies, processors, modules; other suitable devices, components, elements, proprietary appliances, or objects operable to exchange, receive, and transmit information in a network environment; or a combination of two or more of these. A network element may include any suitable hardware, software, components, modules, interfaces, or objects that facilitate operations associated with utilizing user-specified access control lists in conjunction with redirection and load-balancing. This may be inclusive of appropriate algorithms and communication protocols that allow for the effective exchange of data or information. Network element 108 may be deployed in a data center, as an aggregation node (to aggregate traffic from a plurality of access domains), within a core network, or in other suitable configuration.

Similarly, a network node 104 may be any device or system operable to exchange, transmit, and or receive information in a network environment. For example, network nodes may include network switches, routers, servers (physical servers or servers virtually implemented on physical hardware) (e.g., servers 104a-d and 104f), machines (physical machine or machines virtually implemented on physical hardware), end user devices (such as laptop 104h, desktop computer 104e and 104i, smartphone 104j), access points (e.g., 104g), cable boxes, gateways, bridges, load balancers, firewalls, inline service nodes, proxies, processors, modules; or any other suitable devices, components, elements, proprietary appliances, objects operable to exchange, receive, and transmit information in a network environment; or a combination of two or more of these. A network node 104 may include any suitable hardware, software, components, modules, interfaces, or objects that facilitate its communications operations. This may be inclusive of appropriate algorithms and communication protocols that allow for the effective exchange of data or information.

A network node 104 or a network element 108 may include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein and/or provide functionality described or illustrated herein. The components of the one or more computer systems may comprise any suitable physical form, configuration, number, type, and/or layout. Where appropriate, one or more computer systems may be unitary or distributed, span multiple locations, span multiple machines, or reside in a cloud, which may include one or more cloud components in one or more networks.

Each of network 112a, 112b, represents a series of points, nodes, or network elements of interconnected communication paths for receiving and transmitting packets of information that propagate through a communication system. A network offers a communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. In some embodiments, a network may simply comprise a cable (e.g., an Ethernet cable), air, or other transmission medium.

In one particular instance, the architecture of the present disclosure can be associated with a service provider deployment. In other examples, the architecture of the present disclosure would be equally applicable to other communication environments, such as an enterprise wide area network (WAN) deployment. The architecture of the present disclosure may include a configuration capable of transmission control protocol/internet protocol (TCP/IP) communications for the transmission and/or reception of packets in a network.

In certain embodiments, network element 108 may be configured to advertise a VIP configured on network element 108 to neighboring routers, or nodes (e.g., within network 112a), to enable those routers to forward packets destined for the VIP to a designated ingress interface on the network element 108. Data packets destined for the VIP arriving at network element 108 are routed by network element 108 to individual servers (e.g., servers 104a-104d) of the device group identified by the VIP. Servers 104a-104d may be connected to network element 108 via network 112b, as illustrated in FIG. 1, or may be connected directly to ports of network element 108.

Figure 2:
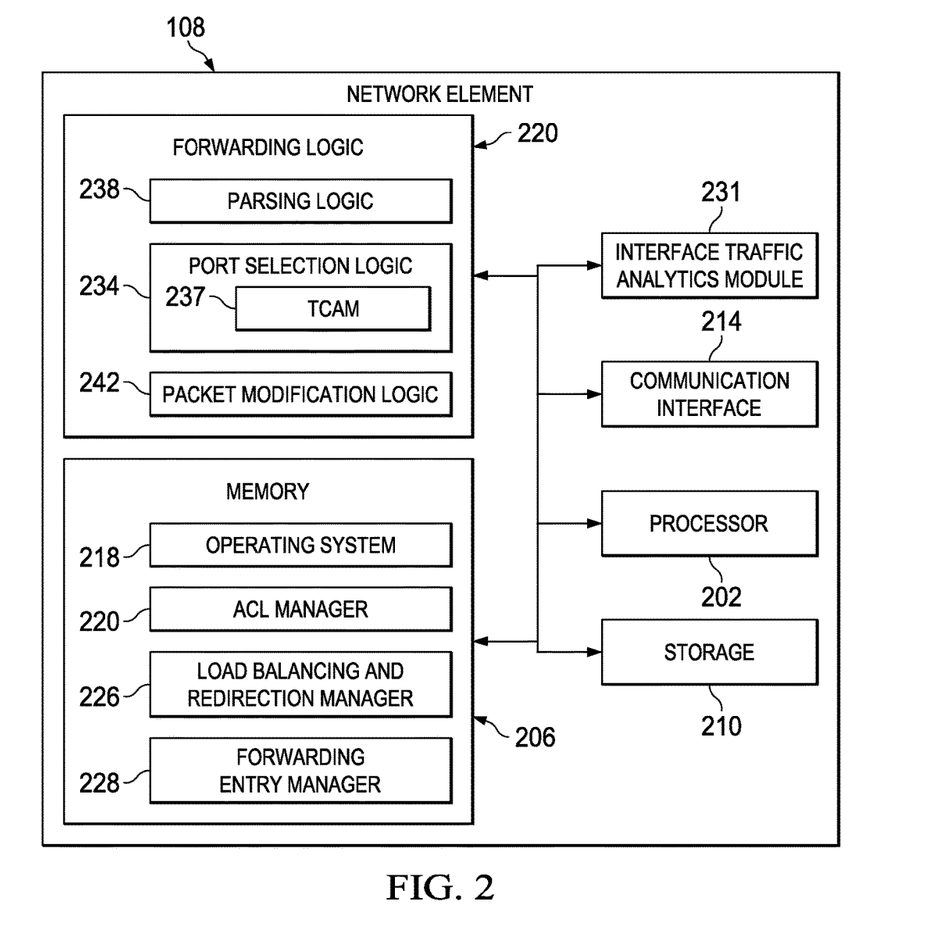
FIG. 2 illustrates a block diagram of a network element of the system of FIG. 1 for implementing an analytics driven traffic redirection and load balancing technique in accordance with embodiments described herein.

FIG. 2 illustrates a block diagram of a network element 108 in accordance with certain embodiments. In the embodiment depicted, network element 108 includes a computer system to facilitate performance of its operations. In particular embodiments, a computer system may include a processor, memory, storage, one or more communication interfaces, and a display. As an example, network element 108 comprises a computer system that includes one or more processors 202, memory 206, storage 210, and one or more communication interfaces 214. These components may work together in order to provide functionality described herein. Network element may also comprise forwarding logic 230. Forwarding logic 230 may be operable to implement one or more traffic forwarding rules with regard to traffic received via communication interface 214 and send the results to communication interface 214 for forwarding out of the appropriate port of network element 108. Additionally, network element 108 may include interface traffic analytics module 231 for tracking packet count and data throughput on each interface of network element 108 for purposes that will be described in greater detail below.

Communication interface 214 may be used for the communication of signaling and/or data between network element 108 and one or more networks (e.g., 112a or 112b) and/or network nodes 104 coupled to a network 112. For example, communication interface 214 may be used to send and receive data packets. Each communication interface 214 may send and receive data and/or signals according to a distinct standard such as Asynchronous Transfer Mode (ATM), Frame Relay, or Gigabit Ethernet (or other IEEE 802.3 standard). In a particular embodiment, communication interface 214 comprises one or more ports that may each function as an ingress and/or egress port. As one example, communication interface 214 may comprise a plurality of Ethernet ports.

Processor 202 may be a microprocessor, controller, or any other suitable computing device, resource, or combination of hardware, stored software and/or encoded logic operable to provide, either alone or in conjunction with other components of network element 108, network element functionality. In some embodiments, network element 108 may utilize multiple processors to perform the functions described herein.

The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Memory 206 and/or storage 210 may comprise any form of volatile or non-volatile memory including, without limitation, magnetic media (e.g., one or more tape drives), optical media, random access memory (RAM), read-only memory (ROM), flash memory, removable media, or any other suitable local or remote memory component or components. Memory 206 and/or storage 210 may store any suitable data or information utilized by network element 108, including software embedded in a computer readable medium, and/or encoded logic incorporated in hardware or otherwise stored (e.g., firmware). Memory 206 and/or storage 210 may also store the results and/or intermediate results of the various calculations and determinations performed by processor 202.

In certain example implementations, the various functions outlined herein may be implemented by logic encoded in one or more non-transitory, tangible, computer-readable media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification.

Any of the memory items discussed herein should be construed as being encompassed within the broad term "memory element." Similarly, any of the potential processing elements, modules, and machines described in this Specification should be construed as being encompassed within the broad term "processor."

In one implementation, a network element 108 described herein may include software to achieve (or to facilitate) the functions discussed herein where the software is executed on one or more processors 202 to carry out the functions. This could include the implementation of one or more instances of an operating system 218, ACL manager 222, load balancing and redirection manager 226, and/or any other suitable elements that would foster the activities discussed herein. In other embodiments, one or more of these elements may be implemented in hardware and/or firmware such as reprogrammable logic in an ASIC.

In some embodiments, the operating system 218 provides an application program interface (API) that allows a network administrator to provide information to the network element 108. For example, the API may allow the network administrator to specify traffic customization information such as one or more ACLs, load balancing commands, and/or redirection commands. In various embodiments, a network administrator may specify the traffic customization information through one or more interfaces, such as a command-line interface (CLI) (e.g., manually entered or entered via a script) or a graphical user interface (GUI) using any suitable programming language (e.g., Extensible Markup Language (xml) or Python).

The operating system 218 may be capable of communicating the traffic customization information received from the network administrator to other portions of network element 108 (e.g., to forwarding logic 230 and interface traffic analytics module 231). In particular embodiments, the operating system 218 is operable to program logic of network element 108 based on traffic customization information received from the network administrator.

The ACL manager 222 maintains and tracks ACLs. An ACL filters network traffic by controlling whether received packets are forwarded or blocked at one or more ports of the network element 108. In particular embodiments, an ACL may apply to traffic received from a single port. In other embodiments, the same ACL may apply to multiple ports.

An ACL may include one or more ACL entries. An ACL entry specifies matching criteria and an indication of whether packets that meet the matching criteria should be permitted (i.e., forwarded) or denied (i.e., blocked). Any suitable matching criteria may be specified, such as one or more identifiers associated with the source and/or destination of the packet. For example, the matching criteria may include one or more source Internet Protocol (IP) addresses, one or more destination IP addresses, one or more source MAC addresses, and/or one or more destination MAC addresses. In some embodiments, the matching criteria may include one or more protocols associated with the packet. For example, an ACL entry may apply only to traffic associated with a single protocol (e.g., Hypertext Transfer Protocol [HTTP]) or may apply to traffic associated with multiple protocols (e.g., HTTP, Secure Sockets Layer [SSL], and File Transfer Protocol [FTP]). In some embodiments, an ACL may include separate ACL entries that are each associated with a different protocol.

The ACLs managed by ACL manager 222 may be generated by any suitable entity, such as the network administrator or various features of network element 208. When an ACL is generated or received by a component of network element 108, the ACL is passed to the ACL manager 222. The ACL manager is responsible for sending the ACL to the forwarding entry manager 228 to be merged with load balancing and/or redirection entries. In addition to receiving and managing user-specified ACLs, the ACL manager may receive ACLs from any suitable feature of network element 108, such as a load balancer, a module implementing Web Cache Communication Protocol, a core policy (e.g., a policy that limits traffic going to processor 202 or a supervisor module associated with network element 108), etc.

In the embodiment depicted, ACL manager 222 is implemented at least in part by instructions stored in memory 206 and executed by processor 202. In some embodiments, ACL manager 222 may be implemented at least in part by hardware and/or firmware of network element 108.

The load balancing and redirection manager 226 interacts with traffic interface analytics module to manage load balancing commands and redirection commands and communicates with forwarding logic 230 to implement these commands. In various embodiments, these commands may be converted into load balancing entries and/or redirection entries before being communicated to forwarding logic 230. In other embodiments, the load balancing commands and/or redirection commands are received in a format similar to the format for the load balancing entries and/or redirection entries described below, such that no conversion is needed.

A redirection entry may specify that traffic matching certain criteria should be redirected to a particular destination. A redirection entry specifies matching criteria and an indication of where to redirect packets that meet the matching criteria. Any suitable matching criteria may be specified, such as one or more identifiers associated with the source and/or destination of the packet. For example, the matching criteria may include one or more source IP addresses, one or more destination IP addresses, one or more source MAC addresses, and/or one or more destination MAC addresses. In some embodiments, the matching criteria may include one or more protocols associated with the packet. For example, a redirection entry may apply only to traffic associated with a single protocol (e.g., TCP or IP) or may apply to traffic associated with multiple protocols (e.g., TCP and IP).

A load balancing command may specify a load balancing scheme. For example, with respect to the embodiment depicted in FIG. 1, a load balancing scheme may specify how traffic forwarded by network element 108 is to be distributed among servers 104a-d. Network element 108 may load balance among any number of suitable network nodes 104, such as firewalls, application servers, other load balancers (e.g., load balancers that perform load balancing in software), inspection devices, etc.

In some embodiments, a load balancing command may be expressed at a higher level of abstraction than one or more corresponding load balancing entries that are created based on the load balancing command. For example, a load balancing command may specify that random network traffic is to be split evenly among the four servers 104a-d while the load balancing entries may specify matching criteria and redirection information to implement the load balancing scheme specified by the load balancing command. In some embodiments, the load balancing entries may have any suitable characteristics of the redirection entries described herein. However a load balancing entry facilitates implementation of a load balancing scheme.

In particular embodiments, a load balancing entry may apply to traffic received from a single port. In other embodiments, the same load balancing entry may apply to multiple ports. Similarly, a redirection entry may apply to one ingress port or multiple ingress ports.

The load balancing and redirection commands managed by load balancing and redirection manager 226 may be generated by any suitable entity, such as the network administrator or various features of network element 108. When a load balancing or redirection command is generated or received by a component of network element 108, the load balancing or redirection command is passed to the load balancing and redirection manager 226. The load balancing and redirection manager 226 is responsible for sending the load balancing and redirection commands (or corresponding entries) to the forwarding entry manager 228 to be merged with one or more ACL entries. In various embodiments, load balancing and redirection manager 226 may update the load balancing entries in response to a change in network topology (e.g., in an additional network node 104 becomes available or one of the network nodes 104a-d goes down).

In the embodiment depicted, load balancing and redirection manager 226 is implemented at least in part by instructions stored in memory 206 and executed by processor 202. In some embodiments, load balancing and redirection manager 226 may be implemented at least in part by hardware and/or firmware of network element 108.

In particular embodiments, forwarding entry manager 228 is operable to merge one or more ACL entries with one or more load balancing entries and/or redirection entries to create a set of one or more forwarding entries. A forwarding entry may have any suitable characteristics of an ACL entry, a load balancing entry, or a redirection entry as described herein. Merging multiple entries to create one or more forwarding entries may involve any suitable operations, such as a logical AND operation based on a portion of at least two of the entries. The result of the merging operations is a set of forwarding entries that implements each ACL, load balancing, and redirection entry received as input to the forwarding entry manager 228. One forwarding entry may simultaneously implement operations associated with an ACL entry and a load balancing entry (or redirection entry) when applied to incoming network traffic.

In particular embodiments, forwarding entry manager 228 creates one or more additional forwarding entries after generating the forwarding entries from the ACL entries and the load balancing entries and/or redirection entries. For example, if the existing forwarding entries do not cover each possible scenario, a default forwarding entry (that may be applied if no other match is found) may be generated that denies all traffic (e.g., if the forwarding entries include one or more entries permitting certain traffic) or permits all traffic (e.g., if the forwarding entries include one or more entries denying certain traffic). In various embodiments, the traffic forwarding entries may have a priority assigned, such that a traffic forwarding entry with a higher priority is checked for a match with a packet to be forwarded before the traffic forwarding entry with the lower priority is checked for a match with the packet. In some embodiments, the default forwarding entry has the lowest priority of the traffic forwarding entries. In various embodiments, the priorities of the traffic forwarding entries are based on user-specified rules associated with the ACL entries and load balancing and/or redirection entries merged to form the traffic forwarding entries.

The forwarding entry manager 228 is responsible for sending the forwarding entries to the forwarding logic 230 to be implemented. As one example, the forwarding entry manager 228 may instruct that the forwarding entries be programmed into a memory (e.g., TCAM 237) of the port selection logic 234 (e.g., by calling a hardware driver associated with the TCAM).

In the embodiment depicted, forwarding entry manager 228 is implemented at least in part by instructions stored in memory 206 and executed by processor 202. In some embodiments, forwarding entry manager 228 may be implemented at least in part by hardware and/or firmware of network element 108.

Forwarding logic 230 is operable to apply the forwarding entries to the appropriate network traffic. In the embodiment depicted, forwarding logic 230 includes port selection logic 234, parsing logic 238, and packet modification logic 242. In various embodiments, any suitable portion of forwarding logic 230 may comprise fixed logic or programmable logic (e.g., software/computer instructions executed by the processor), such as a programmable processor, programmable digital logic (e.g., an FPGA, an EPROM, an EEPROM) or an ASIC that includes digital logic, software, code, electronic instructions, or any suitable combination thereof. In a particular embodiment, forwarding logic 230 comprises an ASIC that is operable to perform customized traffic forwarding in hardware by utilizing logic (e.g., one or more memories such as TCAM 237) that is reprogrammable by an entity (e.g., the operating system 218) based on traffic customization information (e.g., received from a network administrator).

Parsing logic 238 may be operable to receive packets from the ingress ports of network element 108. The parsing logic 238 may be configured to parse any necessary information from a received packet. Parsing logic 238 may be configured to parse any suitable information, such as one or more protocols associated with the packet, a source IP address of the packet, a source MAC address of the packet, a destination IP address of the packet, a destination MAC address of the packet, or other suitable information from the packet. In some embodiments, the parsing logic 238 is configured to parse information based on the information used in the forwarding entries. In some embodiments, the parsing logic 238 is configured on a port-by-port basis, such that packets from each port may be parsed based on the forwarding entries associated with that port. The parsed information is passed to port selection logic 230.

Port selection logic 230 is operable to receive forwarding entries from forwarding entry manager 228 and configure itself to implement the forwarding entries. For example, port selection logic 230 may store the forwarding entries associated with a particular port in a content addressable memory, such as a TCAM 237. When a packet is received on that port, information parsed from the packet by parsing logic 238 (and any other suitable information associated with the packet) may be passed to the port selection logic 234. The port selection logic 234 uses this information to perform a lookup in the TCAM. Port selection logic 234 will then forward the traffic through the appropriate port in accordance with the forwarding entry that matches the information parsed from the packet. If the packet is to be redirected, packet modification logic may modify the appropriate fields of the packet (e.g., destination IP address and/or destination MAC address) before the packet is forwarded out of the appropriate egress port of network element 108.

In one embodiment, the interface traffic analytics module 244 includes implements intelligent analytics based open controller solution for power saving and efficient usages of virtualized network resources is implemented using network traffic data on a day-to-day basis in determining traffic redirection. This embodiment performs predictive analysis of the resources and provides intelligent information to be used in maintaining and using the resources. In one embodiment, the technique may managed by open controller, which manages all of the resources to result in cost savings.

Power usage may be proportional to the traffic being processed by a switch in traffic switching, redirection, or load balancing to another network resource, which may be a server, a virtualized server, or another service appliance and may increase linearly from static power usage to peak power usage. "Static power" is the minimum power necessary to keep a network resource running when there is no traffic being switched by the resource. "Peak power" is the power usage of the resource at peak traffic rate. There is a correlation between the packet count on the interface and the power used by the resource; however, the values vary based on the switching capability of the resource.

In one embodiment of techniques described herein, packet count information is collected at periodic intervals for each interface and is analyzed for making switching decisions for future traffic. "Buckets" may be created to which interfaces are assigned based on power usage for the corresponding module. The bucket definition and computation is performed as detailed below. In one embodiment, three buckets, designated "LOW," "MEDIUM," and "HIGH" (corresponding respectively to low, medium, and high power usage) are defined. A bucket metric for assigning links to the respective buckets may be defined as power_rate/t(x), where t(x) is equal to x*max_throughput/3. In the example embodiment, x is equal to 1 for bucket LOW, 2 for bucket MEDIUM, and 3 for bucket HIGH. For each of the buckets, bucket_name, switching_cost, and throughput_limit are defined, as illustrated in FIG. 3.

Figure 3:
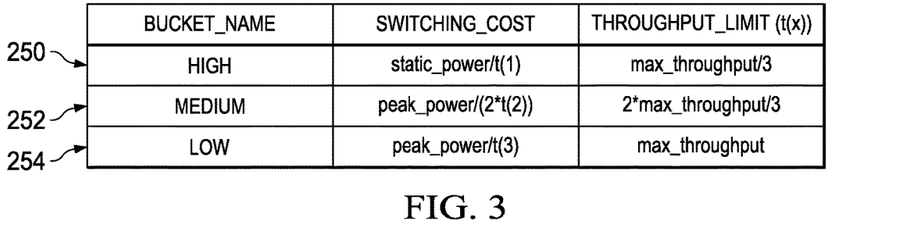
FIG. 3 is a table illustrating bucket metrics for use in connection with a technique for implementing an analytics driven traffic redirection and load balancing technique in accordance with embodiments described herein.

Referring to FIG. 3, line 250 corresponds to the HIGH bucket ("bucket_name=HIGH"). Switching_cost for the HIGH bucket is defined as static_power/t(1) and throughput_limit is defined as max_throughput/3. Line 252 corresponds to the MEDIUM bucket ("bucket_name=MEDIUM"). Switching_cost for the MEDIUM bucket is defined as peak_power/(2*t(2)) and throughput_limit is defined as 2*max_throughput/3. Finally, line 254 corresponds to the LOW bucket ("bucket_name=LOW"). Switching_cost for the LOW bucket is defined as peak_power/t(3) and throughput_limit is defined as max_throughput.

Current packet count and throughput for the last time interval T is tracked for each interface by interface traffic analytics module 231 (FIG. 2). As will be described in greater detail below, the throughput for the last time interval T (e.g., 2 minutes) is used for deciding whether the interface should be moved from the current one of the three buckets to which it is assigned to another. For example, if the throughput for an interface in the HIGH bucket for the last time interval T is greater than max_throughput/3 (the throughput_limit for the HIGH bucket), but less than 2*max_throughput/3 (the throughput_limit for the MEDIUM bucket), the interface is moved to the MEDIUM bucket. Similarly, if the throughput for an interface in the LOW bucket falls below 2*max_throughput/3 (the throughput_limit for the MEDIUM bucket), the interface is moved from the LOW bucket to the MEDIUM bucket.

Additionally, at each occurrence of a given time interval (which may also be time interval T), the packet metric for each interface is computed and a decision is made whether traffic thereon should be switched to another interface for better power management. In one embodiment, the packet metric (or "packet_metric") for each interface is equal to packet_count/max_throughput, where packet count is the packet count during the last time interval T.

Beginning with the LOW bucket (which includes the most efficient links/interfaces), an attempt is made to find the least cost interface in the bucket and redirect the traffic through that interface if there is free capacity. The packet_count for each interface will assist in computing the amount of power saved due to traffic redirection. The traffic rate and packet count will also assist in predicting increase and/or decrease in traffic flow to proactively act by redirecting traffic to a costlier interface to prevent network congestion. This is the auto-load balance feature based on results from an analytical engine. The interfaces in the bucket connect the intelligent traffic director to the server farm. As a result, servers in the server farm can been enabled/disabled based on which interfaces are selected to be active at a given time. In this manner, there remote device can also go into a power saving mode if it has the ability to track traffic on the connected port.

Figure 4:
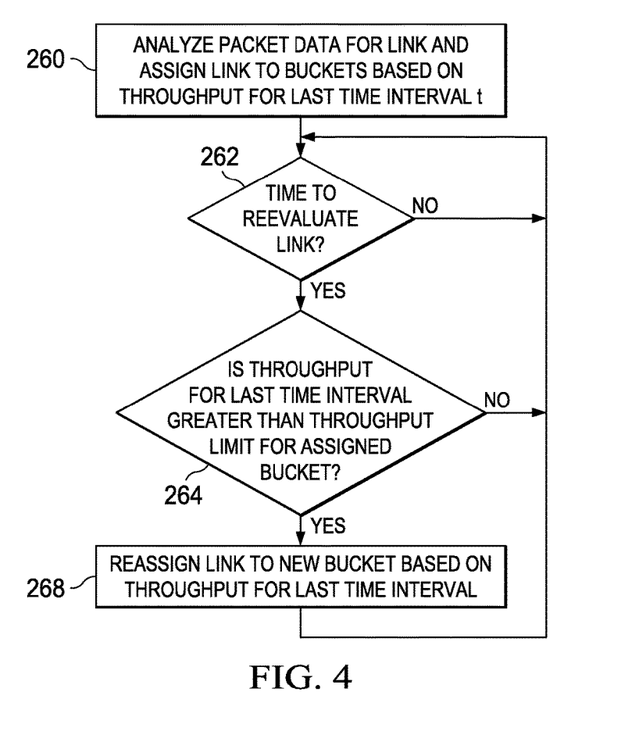
FIG. 4 is a flowchart illustrating operations involved in assigning each interface, or link, to the appropriate buckets based on corresponding throughput for a previous time interval in connection with a technique for implementing an analytics driven traffic redirection and load balancing technique in accordance with embodiments described herein.

FIG. 4 is a flowchart illustrating a technique that may be implemented in certain embodiments for assigning each interface, or link, to the appropriate buckets based on corresponding throughput for a previous time interval. It will be noted that the steps illustrated in FIG. 4 are performed for each interface of the network element. In step 260, packet data collected for the interface is analyzed and the interface is assigned to an initial bucket based on throughput for an immediately preceding time interval T (e.g., 2 minutes). In step 262, a determination is made whether it is time to reevaluate the interface; that is, whether another time interval T has elapsed. If not, execution remains at step 262 until a positive determination is made, at which point, execution proceeds to step 264. In step 264, a determination is made whether the throughput for the last time interval T for the interface is greater than the throughput limit for the bucket to which the interface is currently assigned. If a negative determinant is made in step 264, execution returns to step 262 to await the expiration of the current time interval; otherwise, execution proceeds to step 268. In step 268, the interface is reassigned to the appropriate new bucket based on throughput for the last time interval T. Execution then returns to step 262 to await the expiration of the current time interval.

Figure 5:
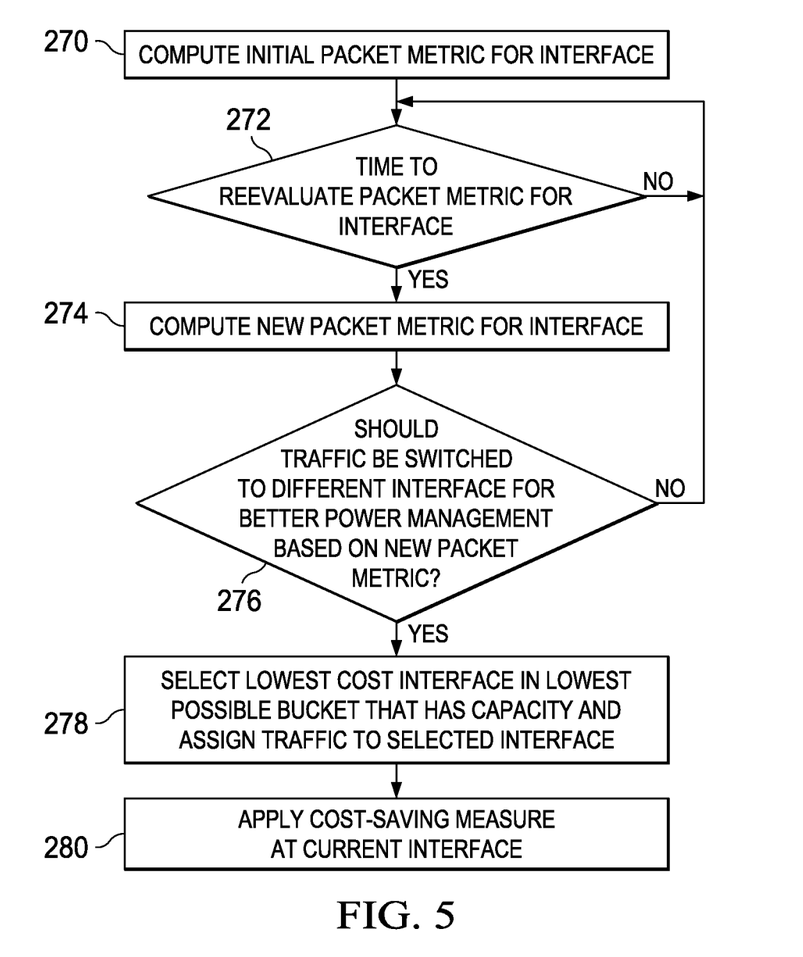
FIG. 5 is a flow chart illustrating operations involved in reassignment of traffic from one interface to another based on traffic analytics in connection with a technique for implementing an analytics driven traffic redirection and load balancing technique in accordance with embodiments described herein.

FIG. 5 is a flowchart illustrating reassignment of traffic from one interface to another based on traffic analytics in accordance with embodiments described herein. It will be recognized that the steps performed in connection with the technique illustrated in FIG. 5 are executed for each interface on the network device. In step 270, an initial packet metric is computed for the interface. In step 272, a determination is made whether it is time to reevaluate the packet metric for the interface. In certain embodiments, this determination involves determining whether a time interval established for this purpose has expired. If not, execution remains at step 272; otherwise, execution proceeds to step 274 and a new packet metric is computed for the interface using data collected during the previous time interval. In step 276, the packet metric is examined and a determination is made whether the traffic should be switched to a different interface to enable better power management. In particular, links that consume less power will be favored over links that consume more power. In this manner, overall power usage can be reduced. In certain embodiments, this is accomplished by determining whether there is an available link in a lower (e.g., LOW, if the current link is in the MEDIUM bucket, or LOW or MEDIUM, if the current link is in the HIGH bucket). If a negative determination is made in step 276, execution returns to step 272 to await expiration of the current time interval; otherwise, execution proceeds to step 278. In step 278, the lowest cost interface in the lowest possible bucket that has capacity is selected and traffic is assigned to that interface. In step 280, cost saving measures are applied to the current interface (i.e., the interface from which the traffic was redirected in step 278). Such cost saving measures may include directing the device (such as a server or virtual server) connected to the interface to go into low-power mode or to power off altogether.

Embodiments described herein comprise an analytics driven technique for selecting the right set of network links to be used in traffic redirection and load balancing. These embodiments save power in a network by looking at the link usage and traffic patterns and selecting the link that consumes the least amount of power. The embodiments may also be used in a cloud environment to dynamically add or remove virtualized services based on the traffic pattern and link usage over time.

There are various methods of load balancing based on user-configured weight, load on the servers, and load on the links. Embodiments described herein comprise a mechanism that is based on power usage on the link. The link/servers that consume less power can be selected over the link/server that consumes more power. Using intelligent analytics, specific servers/virtual servers can be selected and servers that are not selected may be powered down or moved to hibernation mode to conserve power.

The elements, shown and/or described with reference the FIGURES, are intended for illustrative purposes and are not meant to imply architectural limitations of machines such as those utilized in accordance with the present disclosure. In addition, network element 108 may comprise a machine that may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities related to the system described herein may be implemented in software. In some embodiments, this software could be received or downloaded from a web server, provided on computer-readable media, or configured by a manufacturer of a particular element in order to provide features of embodiments described herein. In some embodiments, one or more of these features may be implemented in hardware, provided external to these elements, or consolidated in any appropriate manner to achieve the intended functionality.

In one example implementation, network element 108 is a network device or computing device, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system described and shown herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements can store data used for the operations described herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Network element 108 may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

It should be noted that much of the infrastructure discussed herein can be provisioned as part of any type of network element. As used herein, the term "network element" or "network device" can encompass computers, servers, network appliances, hosts, routers, switches, gateways, bridges, virtual equipment, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one implementation, network elements/devices can include software to achieve (or to foster) the management activities discussed herein. This could include the implementation of instances of any of the components, engines, logic, etc. shown in the FIGURES. Additionally, each of these devices can have an internal structure (e.g., a processor, a memory element, etc.) to facilitate some of the operations described herein. In other embodiments, these management activities may be executed externally to these devices, or included in some other network element to achieve the intended functionality. Alternatively, these network devices may include software (or reciprocating software) that can coordinate with other network elements in order to achieve the management activities described herein. In still other embodiments, one or several devices may include any suitable algorithms, hardware, software, components, modules, interfaces, or objects that facilitate the operations thereof.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
calculating a packet metric for a first one of a plurality of links connected to a network element, wherein the packet metric is equal to a packet count over a period of time T divided by a maximum throughput of the first one of the plurality of links;
determining based on the packet metric whether traffic on the first one of the plurality of links should be switched to another one of the plurality of links to optimize power usage;

if a determination is made that the traffic on the first one of the links should be switched to the other one of the plurality of links:
  selecting a second link from a subset of the plurality of links;
  assigning the traffic to the selected second link; and
  applying a cost saving measure at an interface of the network element to which the first one of the plurality of links is connected; and
assigning the first one of the plurality of links to one of a plurality of subsets of the plurality of links based on a data throughput of the first one of the plurality of links for a previous predetermined time interval, wherein each one of the plurality of subsets is associated with a throughput range and each one of the plurality of links is assigned to one of the subsets based on a throughput of the link falling within the throughput range associated with the subset to which the link is assigned.

2. The method of claim 1, wherein the cost saving measure comprises powering off a network device connected to the network element via the first one of the plurality of links.

3. The method of claim 1, wherein the cost saving measure comprises causing a network device connected to the network element via the first one of the plurality of links to enter a low power mode.

4. The method of claim 1 further comprising reevaluating the data throughput of the first one of the plurality of links upon expiration of a next predetermined time interval and reassigning the first one of the plurality of links to one of the plurality of subsets based on the reevaluated data throughput.

5. The method of claim 1, wherein the selecting comprises selecting one of the plurality of links having a lowest cost and available capacity.

6. The method of claim 1, wherein the network element comprises a switch and a network device connected to the network element via the first one of the plurality of links comprises a server.

7. One or more non-transitory tangible media that includes code for execution and when executed by a processor is operable to perform operations comprising:
  calculating a packet metric for a first one of a plurality of links connected to a network element, wherein the packet metric is equal to a packet count over a period of time T divided by a maximum throughput of the first one of the plurality of links;
  determining based on the packet metric whether traffic on the first one of the plurality of links should be switched to another one of the plurality of links to optimize power usage;
  if a determination is made that the traffic on the first one of the links should be switched to the other one of the plurality of links:
    selecting a second link from a subset of the plurality of links;
    assigning the traffic to the selected second link; and
    applying a cost saving measure at an interface of the network element to which the first one of the plurality of links is connected; and
  assigning the first one of the plurality of links to one of a plurality of subsets of the plurality of links based on a data throughput of the first one of the plurality of links for a previous predetermined time interval, wherein each one of the plurality of subsets is associated with a throughput range and each one of the plurality of links is assigned to one of the subsets based on a throughput of the link falling within the throughput range associated with the subset to which the link is assigned.

8. The media of claim 7, wherein the cost saving measure comprises powering off a network device connected to the network element via the first one of the plurality of links.

9. The media of claim 7, wherein the cost saving measure comprises causing a network device connected to the network element via the first one of the plurality of links to enter a low power mode.

10. The media of claim 7, wherein the operations further comprise reevaluating the data throughput of the first one of the plurality of links upon expiration of a next predetermined time interval and reassigning the first one of the plurality of links to one of the plurality of subsets based on the reevaluated data throughput.

11. The media of claim 7, wherein the selecting comprises selecting one of the plurality of links having a lowest cost and available capacity.

12. An apparatus comprising:
  a memory element configured to store data; and
  a processor operable to execute instructions associated with the data;
  wherein the apparatus is configured to:
    calculate a packet metric for a first one of a plurality of links connected to a network element, wherein the packet metric is equal to a packet count over a period of time T divided by a maximum throughput of the first one of the plurality of links;
    determine based on the packet metric whether traffic on the first one of the plurality of links should be switched to another one of the plurality of links to optimize power usage;
    if a determination is made that the traffic on the first one of the links should be switched to the other one of the plurality of links:
      select a second link from a subset of the plurality of links;
      assign the traffic to the selected second link; and
      apply a cost saving measure at an interface of the network element to which the first one of the plurality of links is connected; and
    assign the first one of the plurality of links to one of a plurality of subsets of the plurality of links based on a data throughput of the first one of the plurality of links for a previous predetermined time interval, wherein each one of the plurality of subsets is associated with a throughput range and each one of the plurality of links is assigned to one of the subsets based on a throughput of the link falling within the throughput range associated with the subset to which the link is assigned.

13. The apparatus of claim 12, wherein the cost saving measure comprises one of powering off a network device connected to the network element via the first one of the plurality of links and causing the network device to enter a low power mode.

14. The apparatus of claim 12, wherein the apparatus is further configured to:
  reevaluate the data throughput of the first one of the plurality of links upon expiration of a next predetermined time interval and reassign the first one of the plurality of links to one of the plurality of subsets based on the reevaluated data throughput.

15. The apparatus of claim 12, wherein the selecting comprises selecting one of the plurality of links having a lowest cost and available capacity.

* * * * *